United States Patent [19]

Korthuis et al.

[11] Patent Number: 4,972,662

[45] Date of Patent: Nov. 27, 1990

[54] CROP HARVESTER AGGREGATING APPARATUS

[76] Inventors: Donald L. Korthuis, 606 Cascade Ct.; Scott A. Korthuis, 856 Garden Dr., both of Lynden, Wash. 98264

[21] Appl. No.: 355,638

[22] Filed: May 23, 1989

[51] Int. Cl.[5] ............................................. A01D 46/26
[52] U.S. Cl. .................................... 56/10.2; 56/16.4; 56/329; 56/330; 198/301; 198/819
[58] Field of Search ...................... 56/16.4, 10.2, 328.1, 56/329, 330, 10.6, 10.7; 414/439, 491, 528; 198/301, 628, 819

[56] References Cited

U.S. PATENT DOCUMENTS

| | | | |
|---|---|---|---|
| 3,414,200 | 12/1968 | Savory | 414/439 |
| 3,550,866 | 12/1970 | Swenson | 414/528 |
| 3,901,005 | 8/1975 | Rohrbach et al. | 56/330 |
| 4,176,511 | 12/1979 | Scudder et al. | 56/330 |
| 4,204,389 | 5/1980 | Deifosse | 56/330 |
| 4,702,065 | 10/1987 | Littau | 56/329 |

FOREIGN PATENT DOCUMENTS

| | | | |
|---|---|---|---|
| 2424695 | 1/1980 | France | 56/330 |
| 2590760 | 6/1987 | France | 56/328.1 |
| 2023391 | 1/1980 | United Kingdom | 56/330 |

OTHER PUBLICATIONS

Ramsay, "Mechanical Harvesting of Raspberries: Development of a System for Scottish Conditions", 1985.

*Primary Examiner*—Bruce M. Kisliuk
*Attorney, Agent, or Firm*—Hughes & Multer

[57] ABSTRACT

A system carried in a harvesting machine and adapted to align crops in a row so as to enhance harvesting, comprises a crop aggregating means which aggregates the crops by bringing first and second crop engaging means into engagement with right and left sides of the crops as the crops pass rearwardly. The system further comprises a locomotion means, which provides the main locomotion for the harvesting machine, an aggregating drive means to drive the crop engaging means rearwardly and a control means, connected together in a fluid circuit. The control means comprises a pressure differential valve, and first and second sensors. The pressure sensors are adapted to sense first and second fluid pressures, respectively, at first and second sides of the aggregating drive means and to actuate the pressure differential valve. The pressure differential valve relieves pressure in the fluid circuit when there is a predetermined pressure difference between the first and second fluid pressures. In a second embodiment the locomotion means is separated from the fluid circuit that provides motive force to the aggregating means. The fluid circuit comprises the pump, the aggregating drive means and pressure control means. The pump operates at a rate in accordance with a rotation of a ground engaging wheel.

3 Claims, 4 Drawing Sheets

CROP HARVESTER AGGREGATING APPARATUS

BACKGROUND OF THE INVENTION

1. Field of the Invention

The present invention relates generally to crop harvesters, and more particularly to such a harvester which is adapted to travel along a row of crops, and to engage said crops and bring them more closely together to enhance the harvesting operation of the crops.

2. Background Art

There are in the prior art harvesting machines which are adapted to harvest such crops as berries, grapes, fruit, other produce from standing plants. Normally such machines comprise a chassis having two side portions which define therebetween a crop engaging area. As the machine travels down a crop row, the crops pass between the two side portions of the machine, and suitable harvesting implements, such as beater rods or the like engage the crop to shake the crop and thus cause removal of the berries or other food product.

It has been found that this harvesting operation can be enhanced if the lower portions of the crops or plants can be engaged so as to squeeze the lower portions of the crops toward the row centerline. Accordingly, one prior art device for accomplishing this is to have two crop engaging belts positioned on opposite sides of the crop, with these belts being urged toward a center location so as to engage the crops with the appropriate pressure. These two belts are then driven so that the crop engaging portions thereof travel rearwardly at substantially the same speed as the forward travel of the vehicle, so that the crop engaging belt portions are "stationary" relative to the crop. Thus, there arises a need to coordinate the rearward speed of the belt engaging portions with the forward travel of the machine. Such an aggregating device is disclosed on pages 33 and 34 of a book entitled "Mechanical Harvesting of Raspberries: Development of a System for Scottish Conditions", authored by A. M. Ramsay, published by the Scottish Institute of Agricultural Engineering, Technical Report No. 7. Also, illustrations of this same system are shown in photographs appearing in different parts of this publication.

U.S. Pat. No. 4,204,389 (Delfosse) shows an endless conveyor in a harvester, the conveyor being timed to be stationary relative to the crop.

One means of monitoring the ground speed of the harvesting machine so that the speed of a crop engaging member can be controlled is by actually measuring the forward speed of the machine and then providing control means responsive to the forward speed of the machine. One method of accomplishing this is by means of a ground engaging wheel which engages the ground and thus rotates at a speed proportional to the forward velocity. One such system is shown in U.S. Pat. No. 4,176,511 (Scudder et al), entitled "Conveyor System for a Harvester", where there are shown two conveyors in the form of endless belts which are positioned on opposite sides of the crop row and which travel rearwardly relative to the machine so that these are "stationary" relative to the crop row. With reference to FIGS. 8, 16 and 17, there is a hydraulic motor 30a which rotates the two belt conveyors, with this motor 30a being driven by a motor 49 which powers a pump 50 that in turn delivers hydraulic fluid through a throttle control valve 53 that in turn delivers the hydraulic fluid to the motor 30a. To control the speed of the motor 30a, the hydraulic fluid that passes from the motor 30a is directed through a feedback system to control operation of the throttle valve 53. More specifically, there is an unloaded ground engaging wheel 52, the speed of rotation of which is a measure of the speed of forward travel of the machine. This wheel 52 connects through a shaft 59 to a drive transmission comprising gears 61, 62 and 63. The hydraulic motor 55 which is a positive drive motor driven from the pump 30a rotates a gear 64 which in turn rotates a gear 58 which in turn rotates the case 60 of the differential transmission. When the speed of the hydraulic motor 30a matches the ground speed as indicated by the wheel 52, the rotational speed of the differential casing 60 matches the rotational speed of the shaft 59 so that there is no output from the differential transmission, and the shaft 54 leading to the throttle valve 53 remains stationary. However, when a difference in the two speeds is sensed, the shaft 54 will be cause to rotate to change the setting of the throttle valve 53 so that the ground speed does match the speed of the hydraulic motor 30a that in turn drives the belt conveyors. One of the problems of this type of system is that not only must the operating components be closely matched, but there is some margin of error in that the ground wheel (such as a ground wheel 52) may not be a truly reliable indication of ground speed. For example, if the ground surface has some irregularities where the ground wheel must travel upwardly and downwardly over the ground surface, the rate of rotation will increase relative to the forward speed of the vehicle. Further, even though these ground wheels can be arranged with devices to increase friction (high friction treads or even pins or the like) which would engage the ground, there can under certain circumstances be slippage of such wheels.

Various other systems and method time the speed of a conveyor or the like to the rotation of a ground wheel, by using a governor responsive to rotation of the ground wheel to control a throttle valve in a hydraulic conveyor drive system, U.S. Pat. No. 3,414,200 (Savory), monitors for monitoring the speed of the conveyor belt and of a vehicle which use electro-optical aperture discs, U.S. Pat. No. 3,550,866 (Swenson), magnetic sensors 46 for sensing and equalizing the speeds of a driven axle and a non-driven axle, U.S. Pat. No. 4,441,848 (Bailey), chains and sprockets, U.S. Pat. Nos. 4,195,570 (Rodriquez) and 3,901,005 (Rohrbach et al) and an intermediate wheel 101 that meshes with a ground wheel and a conveyor to drive the conveyor, U.S. Pat. No. 4,081,094 (Pereira et al). Additionally, U.S. Pat. No. 4,212,428 (Walker) shows a ground wheel that drives a pump 52. The pump 52 provides fluid pressure to operate a motor 36 that drives a conveyor belt.

SUMMARY OF THE INVENTION

The present invention relates to a system for positioning crops in a row which is being harvested by a machine.

A system for positioning crops in a row which is being harvested by a machine in a manner to minimize damage to the crops, comprises crop aggregating means, crop aggregating drive means, and control means. The crop aggregating means, connected to the harvester, aggregates the crops by bringing first and second crop engaging means into engagement with the crops as the crops pass rearwardly with respect to the machine in a pathway defined between the first and second crop engagement means. The crop aggregating drive means drives the crop engaging means rearwardly along the crop engaging path with respect to the machine as the machine travels forwardly relative to the crops. The control means responds to a force imparted by the engaging means by engagement with the crops along the crop engaging path, thereby matching the speed of the crop engaging means with the speed of the machine. This protects the crops from the effects of friction between the crop engaging means and the crops.

The drive means comprising a hydraulic motor, receives hydraulic fluid the pressure of which is controlled by the control means. The control means comprises pressure relief valve means operably connected to the hydraulic motor, thereby controlling fluid pressure directed to the hydraulic motor. The hydraulic pump means is operably connected to the hydraulic motor means so as supply hydraulic fluid under pressure to the hydraulic motor means. At a given volumetric flow rate of hydraulic fluid, the hydraulic pump means drives the machine at a given linear speed which is less than the linear speed at which the crop aggregating drive means drives linearly the crop engaging means, at the given rate of volumetric flow. Accordingly, with the speed of travel of the machine being equal to the linear speed of the crop engaging means, the pressure relief valve means remains in an open position to bypass a portion of hydraulic flow around the aggregating drive means.

The pressure relief valve means is connected in parallel with the hydraulic motor means in a manner that fluid flow above a preset pressure level is bypassed from around the hydraulic motor. The pressure relief valve means comprises pressure differential valve means which opens in response to a predetermined difference in pressure at locations upstream and downstream of the hydraulic motor.

Alternatively, the crop aggregating drive means comprises first and second hydraulic motors connected to, respectively, the first and second crop aggregating means, the control means comprising pressure relief valve means positioned in parallel with the first and second hydraulic motors. The pressure relief valve means comprises pressure differential valve means which senses pressure at locations upstream and downstream of the first and second hydraulic motors.

Also, there is selectively operable valve means connected between the hydraulic pump means and the crop aggregating drive means to selectively drive hydraulic fluid from the hydraulic pump means to the hydraulic motor means, bypassing the crop aggregating drive means, or on a path through the crop aggregating drive means to the hydraulic motor means.

In a second embodiment, the crop aggregating drive means comprises a hydraulic motor means which delivers power to the crop aggregating means and hydraulic pump means which delivers hydraulic fluid to the hydraulic motor, the system further comprising ground speed monitoring means to measure speed of the machine and to control output of the hydraulic motor means in accordance with the speed of the machine. The control means comprises pressure relief valve means operably connected to the hydraulic motor means thereby controlling fluid pressure directed to the hydraulic motor means, wherein at a given volumetric flow rate of hydraulic fluid, the hydraulic pump means drives the machine at a given linear speed which is less than a linear speed at which the crop aggregating drive means drives linearly the crop engaging means, at the given rate of volumetric flow. Accordingly, the speed of travel of the machine is equal to the linear speed of the crop engaging means, with the pressure relief valve means remaining in an open position to bypass a portion of hydraulic flow around the aggregating drive means.

DESCRIPTION OF THE PREFERRED EMBODIMENT

Figure 1:
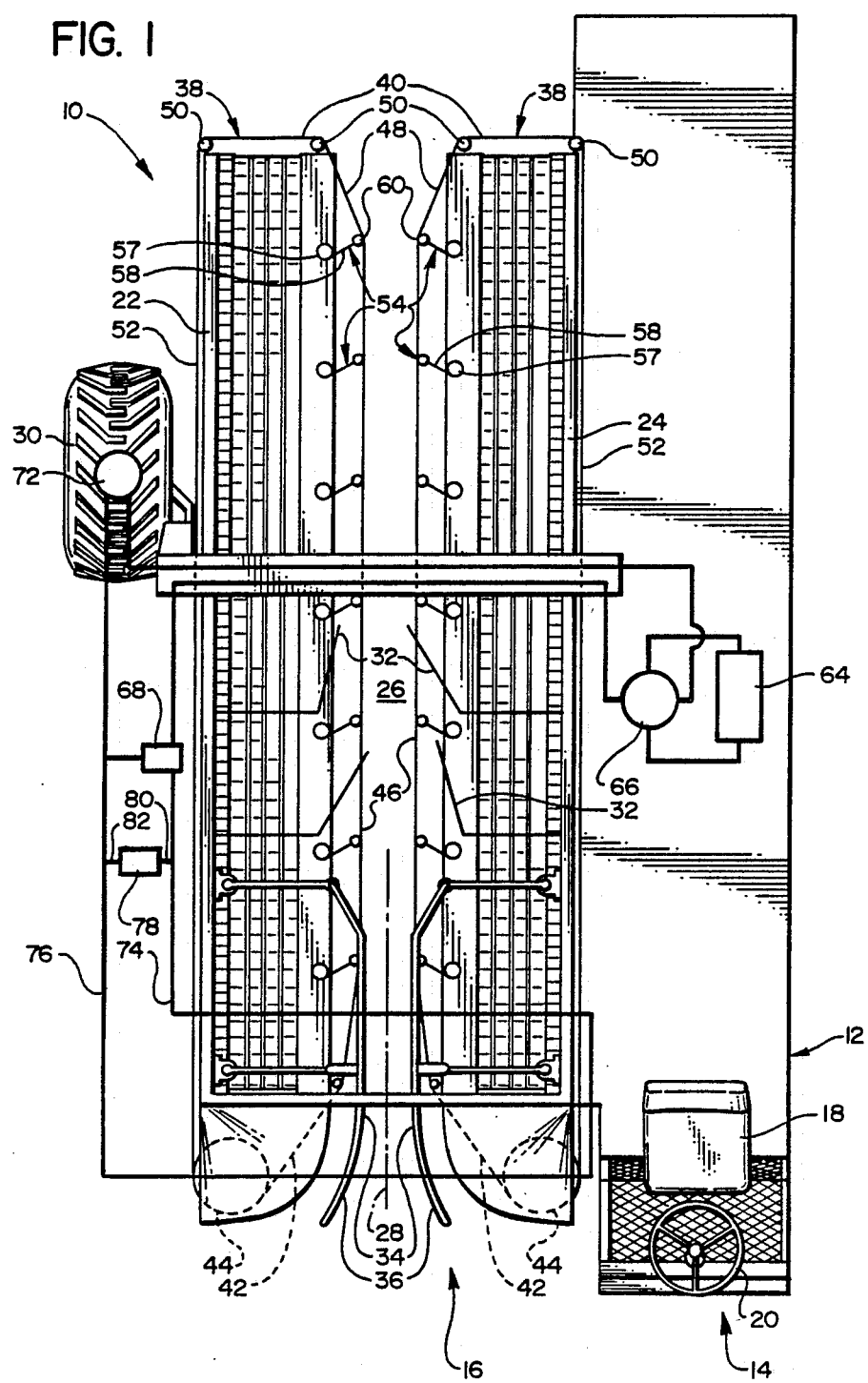
FIG. 1 is a top plan view of a harvesting machine employing teachings of the present invention with the top removed and with portions of the components removed for purposes of illustration, also including a schematic representation of a drive system for the crop aggregating belts.

FIG. 1 is a top plan view showing generally a harvesting machine 10 suitable for incorporating the system of the present invention. As is common in the prior art, the operator's section 14 provides a seat 18 for the operator and a manually operated steering wheel 20. In addition, the operator's section 14 could provide a location for collecting the food product that is being harvested and possibly serve other functions.

The harvesting section 16 comprises right and left frame portions 22 and 24, respectively, which define therebetween a middle crop harvesting area or region 26. For purposes of description, the harvesting section 16 will be considered as having a center longitudinal axis 28, and this axis 28 will generally coincide rather closely with a centerline of a row of the crops which are being harvested.

In describing the present invention, the terms "inward" or "inwardly" will denote a direction toward, or proximity to, the longitudinal center axis 28, while the terms "outward" or "outwardly" will denote the opposite.

In general, such harvesting machine 10 will comprise a turning means, such as at least one forward steerable wheel (not shown for ease of illustration) located at a forward corner of the machine, and being steerable to properly align the machine 10, and a pair of rear wheels, one of which is shown at 30, with at least one of these rear wheels being a power driven wheel to move the machine. Also, as is common in the prior art, there are provided suitable harvesting elements such as beater rods 32 which reciprocate to come into engagement with the crop so as to shake the food product from the bushes or plants.

A suitable automatic steering means can be provided. Specifically, as shown herein, there are two crop engaging members 34 positioned at a forward location on the machine 10 on opposite sides of the longitudinal axis 28. These crop engaging members have converging end portions 36 that define a converging throat to receive the crop, and lateral displacement of these crop engaging members 34 operate a suitable control mechanism which automatically steers the front steerable wheel to maintain the machine 10 in close alignment with the crop row. Such a steering mechanism is disclosed in a U.S. Patent Application, entitled "METHOD AND SYSTEM FOR AUTOMATICALLY STEERING ALONG ROW CROPS" with the inventors being the same as the inventors herein, this application being filed on May 19, 1989, the contents of which are hereby incorporated by reference.

As indicated previously, the present invention is particularly directed toward a means of aggregating the crop (i.e. squeezing the crop inwardly) to enhance the harvesting operation. As shown herein, there is a crop aggregating assembly 38 which comprises a pair of endless belts 40 which are mounted at a lower location of the chassis 12 and are positioned on opposite sides of the longitudinal axis 28. Each belt 40 has a forward belt portion 42, which engages a related hydraulic drive motor 44 and extends rearwardly and moderately inwardly to a crop engaging belt portion 46 that is positioned more closely to the longitudinal center axis 28. Rearwardly of the crop engaging belt portion 46, the belt extends at 48 around a pair of rear idler wheels 50, with the belt having a return run 52 that leads to the aforementioned forward belt section 42 that engages the drive motor 44.

Figure 1A:
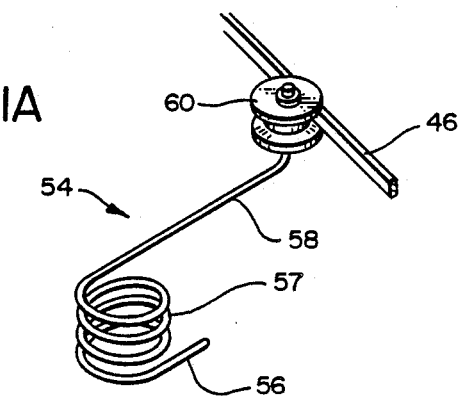
FIG. 1a is a detail of a positioning member which is used to support the crop aggregating belt.
Figure 2:
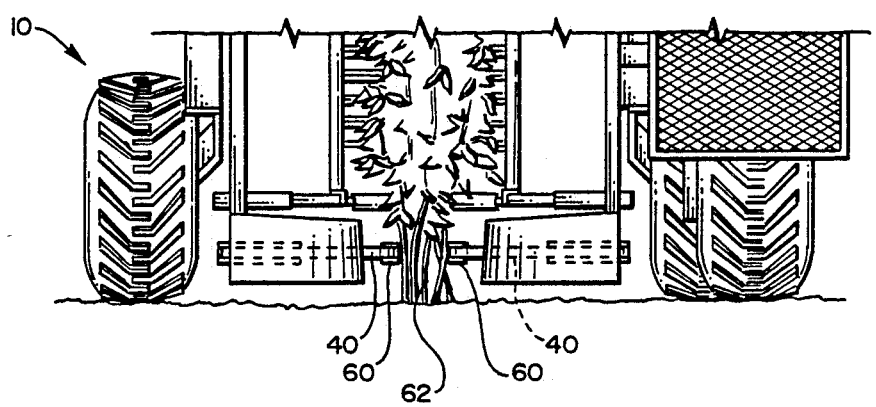
FIG. 2 is a front end view of the harvester of FIG. 1.

To urge each of the crop engaging belt sections 46 into proper engagement with the crop, there are provided along the length of the belt section 46 a plurality of positioning arms 54 as best shown in FIG. 1A. Each positioning arm 54 is mounted at 56 and coiled to form a coiled spring portion 57 leading to an arm portion 58 which extends from the mounting 56 rearwardly and inwardly to a respective roller 60 mounted at the rear swing end of the arm portion 58, with this roller 60 engaging its related crop engaging belt portion 46, the coil portion 57 bringing the arm portion 58 into proper yielding engagement with the belt section 46. Thus, it is imperative as shown in FIG. 1 that as the crops enter into the harvesting area of the chassis 12, the two belt engaging portions 46 engage the crop (a couple of plants of this crop having the lower portions thereof indicated at 62 in FIG. 2) with the appropriate pressure as determined by the strength of the respective coiled spring portions 57) to hold the lower stems of the crop plant 62 together.

As a preliminary comment, is to be understood that the main components of the crop aggregating assembly 38 as described above are already known in the prior art, and actually are shown in the publication noted under Background Art, entitled "Mechanical Harvesting of Raspberries: Development of a System for Scottish Conditions". One of the important considerations in incorporating such a crop aggregating assembly 38 is that the linear speed of each of the crop aggregating belts 40 closely match the forward speed of travel of the machine 10 so that there is no scruffing action which might damage the somewhat sensitive stems of the plants. Further, it is desirable that the force exerted by the crop engaging portions 46 be substantially a lateral inward force, and not a longitudinally directed force which would have the tendency of possibly damaging the stems.

With the foregoing in mind, there will now be a description of the drive and control system of the present invention which, in combination with the elements described above, provide unique advantages over the prior art.

Figure 4:
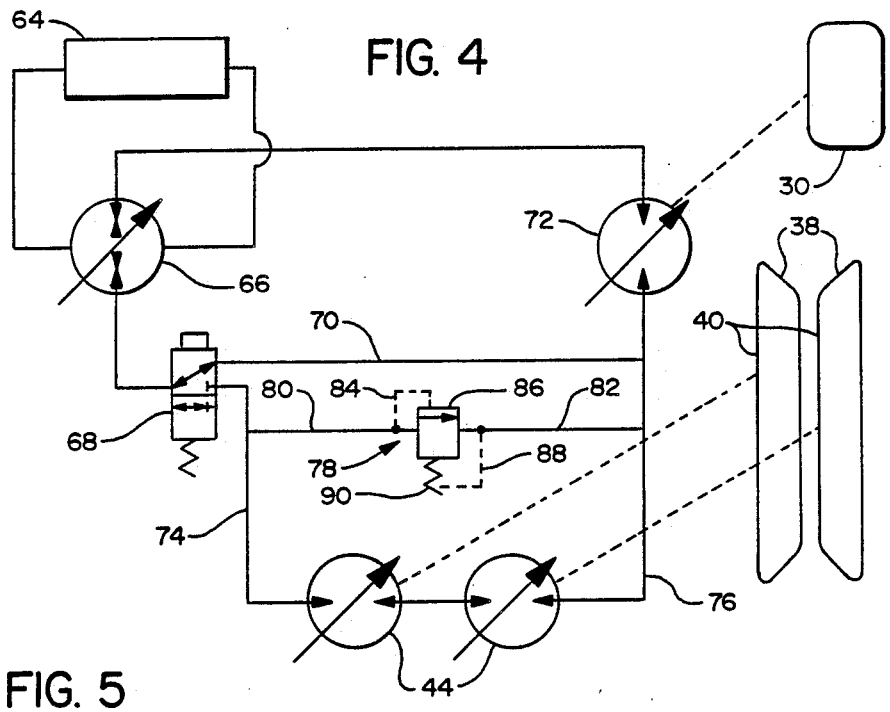
FIG. 4 is a schematic view of the pump and drive components in a hydraulic system in the present invention.

To describe a first embodiment of the present invention, reference is made to the schematic drawing of FIG. 4. There is a fluid reservoir 64 which provides hydraulic fluid for makeup oil for a main hydraulic pump 66 which in turn delivers fluid under pressure through a selectively operable control valve 68. This control valve 68 has a first position (shown in FIG. 4) where the fluid is moved directly through a line 70 to a main hydraulic motor 72 that in turn rotates the one or more of the drive wheels 30. The valve 68 can be moved to a second position where no fluid is delivered through the line 70, the fluid is directed through a second line 74 that leads to the two aforementioned hydraulic motors 44 which are connected in series with one another. The hydraulic line 76 from the second of these drive motors 44 then leads to the main hydraulic motor 72.

There is provided a differential pressure relief valve 78 that is connected through a first line 80, and a second line 82 which extends from the valve 78 to the line 76 that leads from the second motor 44 to the main hydraulic motor 72. This relief valve 78 is arranged so that it responds to a pressure differential in the lines 80 and 82. This function is indicated somewhat schematically, by the broken line 84 extending from the first line 80 into one side of a valve element 86, and a second valve line 88 extending from the line 82 to an opposite side of the valve element 86. A spring member 90 urges the valve element 86 toward its closed position, as shown in FIG. 4. Thus, when the pressure differential in the two lines 80 and 82 is at a lower level, the force of the spring 90 will be sufficient to maintain the valve element 86 in its closed position. However, when the pressure in the line 80 exceeds the pressure of the line 82 by a predetermined margin, the hydraulic pressure will be sufficient to move the valve element 86 (downwardly as shown in FIG. 4) to its open position to cause hydraulic fluid to bypass the two motors 44. Also, the spring member 90 is adjustable so that the level of the pressure differential at which the bypass valve 78 will open can be accurately adjusted.

With regard to the setting of the control valve 78, it is to be understood that the pressure drop at locations upstream and downstream of the drive motors 44 will be proportional to the resistance (primarily internal) against the movement of the belts 40 of the crop aggregating assemblies 38. As indicated previously, it is desirable that the engagement of the belt portions 46 against the crops 62 be such that there is essentially an inwardly directed force (i.e. a "squeezing" force toward the longitudinal center locating plane 28), and very little, if any, longitudinal force which would tend to cause the belt portions 46 to possibly scruff away bark or possibly damage the plants in some other way. Thus, the setting of the pressure relief valve 78 should be such that it will react to a pressure differential level which is just at the level at which the motors 44 are able to generate sufficient force to overcome the internal resistance or power losses due to the operation of the assemblies 48 themselves.

In actual practice, a fairly close estimate of the setting of the valve 78 can be achieved simply by operating the belt aggregating assembly 38 without engaging any of the crop 62, and then manually grasping one of the belts 40 to determine if the belt can be stopped simply by a moderate force exerted by the person's hand. At such time as the person is manually able to stop the belt without exerting an excessive amount of force on the belt, the setting of the valve 78 would be at the level where the motors 44 are just able to overcome the internal operating resistance of the assembly 38 and possibly deliver just slightly greater power to compensate for any additional losses which might be contributed, for example, to greater internal frictional resistance of the belt 40 against the positioning rollers 58.

To describe the overall operation of the present invention, let it be assumed that the machine 10 is traveling toward a crop, but is not engaged in a harvesting operation. In this instance, the main control valve 68 is set to the position shown in FIG. 4 so that there is no operation of the crop aggregating assemblies 38. At such time as the machine 10 begins moving into engagement with a crop row, the valve 68 is moved to its second position (i.e. moved upwardly in the showing of FIG. 4) so that hydraulic power is delivered first through the belt drive motors 44 and thence through the main drive motor 72 which powers the drive wheel or wheels 30 and possibly performs other functions of the machine 10. It is to be understood that since the fluid flow path is in series between the motors 44 and the motor 72, the relative speeds of these motors 44 and 72 are fixed. Desirably, these relative speeds are such that the linear speed of the belts 40 is just greater than the speed of travel of the machine 10. Thus, with the relief valve 78 closed, there is a tendency for the belts 40 to travel faster than the forward motion of the machine 10. For this reason, in normal operation, the valve 78 will generally remain open just to the extent to provide the proper balance of pressure on the upstream and the downstream sides of the motors 44.

Under a situation where the pressure relief valve 78 is set at a level just below the desired pressure level at which it should open, there could be a situation where the power delivered by the hydraulic fluid to the motors 44 would not be sufficient to overcome the internal resistance of the operation of the aggregating assembly 38. Under these conditions, the belt engaging portions 46 would engage the crop 62, but there would not be quite enough power to move the belt portions 44 to match the forward speed of the machine 10. Under these circumstances, there would be a force exerted by the plants 62 engaging the belts 40 to help move the belt portions 46 rearwardly so as to supplement the power supplied by the motors 44. Thus, it is to be understood that while the setting of the pressure relief valve 78 is desirably set at the precise operating level, and even if it is at a level just below the desired operating level, the scruffing action against the plants is substantially alleviated.

Let us now examine a situation where the machine 10 requires that greater power be delivered by the main hydraulic motor 72 to maintain an adequate ground speed, with such a situation arising when the machine 10 is traveling up an incline. Under these circumstances, the hydraulic pump 66 must necessarily deliver hydraulic fluid at higher pressure, and this would in turn increase the pressure on the upstream side of the motors 44. However, since the control valve 78 is responsive to differential pressure on the upstream and downstream side of the motors 44, the power delivered to the motors 44 would be substantially the same as if the machine 10 were operating over a level surface where the drive power requirements are less and the fluid pressure in the system upstream of the main drive motor 72 would be less.

Figure 3:
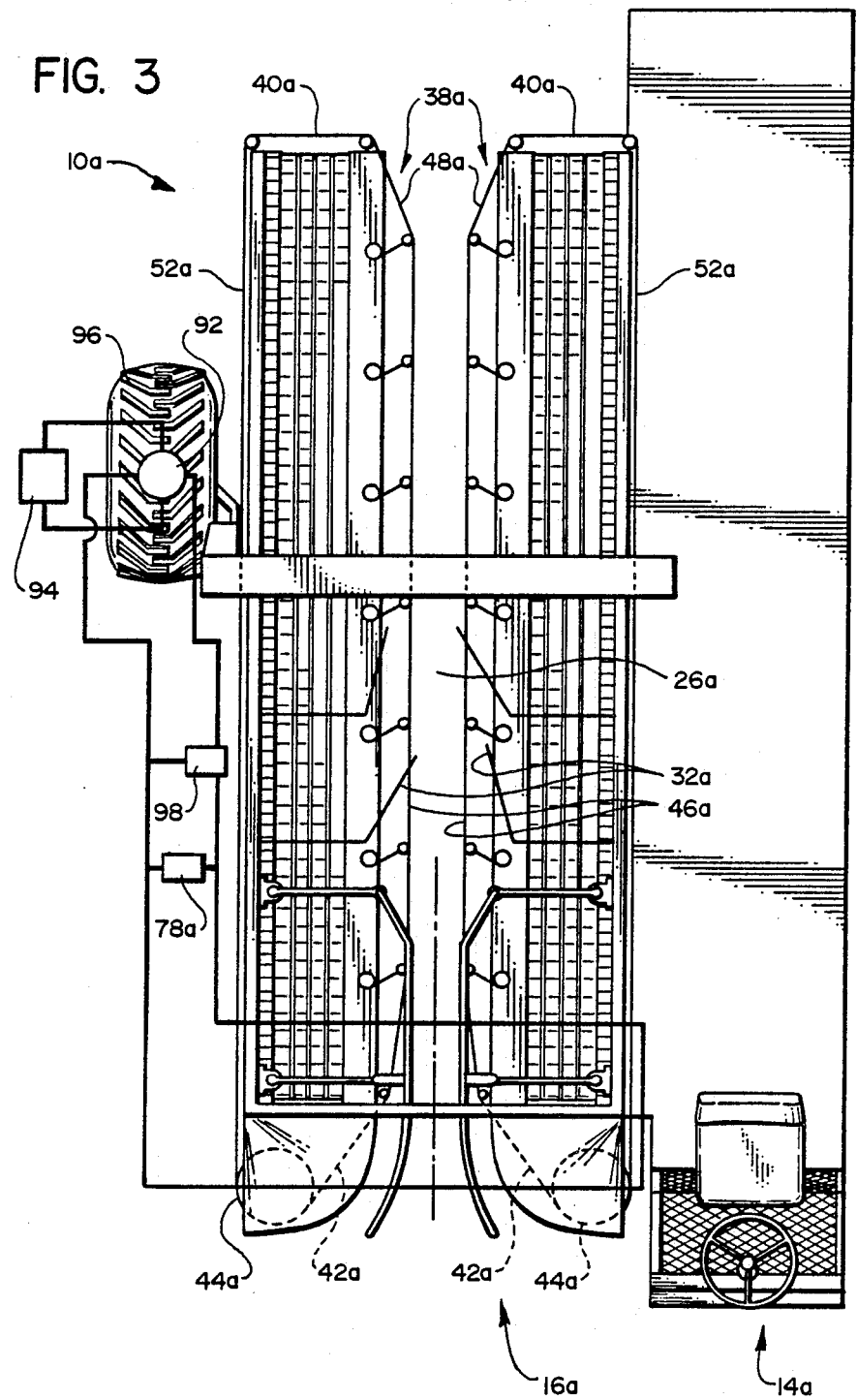
FIG. 3 is a view similar to the view of FIG. 1 showing a second embodiment of the invention.
Figure 5:
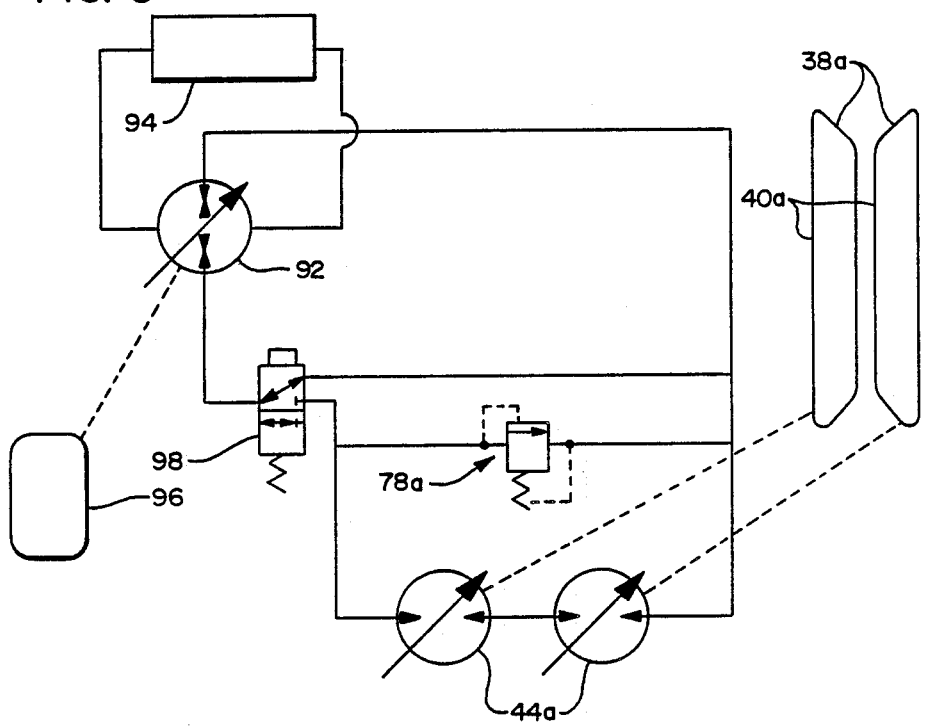
FIG. 5 is a view similar to FIG. 4 showing a second embodiment of the invention.

A second embodiment of the present invention is illustrated in FIGS. 3 and 5, FIG. 3 being a top plan view of the machine and FIG. 5 being a schematic drawing of the control system of the second embodiment. Components of this second embodiment which are similar to those of the first embodiment will be given like numerical designations, with an "a" suffix distinguishing those of the second embodiment.

This second embodiment is distinguished from the first embodiment primarily in that the drive system for the belts second embodiment is separated from the main drive system of the machine. Thus, there is provided a relatively small hydraulic pump 92 which draws fluid from a reservoir 94. This pump 92 is connected directly to a speed monitoring ground wheel 96 so that the volume output of the pump 92 corresponds to the rotational speed of the ground wheel 96. As shown herein, there is a direct drive connection between the ground wheel 96 and the pump 92 so that the power for the pump 92 is derived from the ground wheel 96. However, power for the pump could be derived from another source.

The pump 92 leads through an on/off valve 98 to the motors 44a which are, as in the first embodiment, connected in series with one another and which are operatively connected to the belts 40a, and the flow from the second motor 44a leads directly back to the pump 92. There is a pressure relief control valve 78a connected in parallel with the two motors 44a, but this pressure relief valve 78a leads directly to the pump 92. As shown herein, this valve 78a is again a pressure relief differential valve.

On the assumption (which is not shown) that the reservoir 94 is connected in series between the motors 44a and the main pump 92, and that the fluid in the reservoir 94 is maintained at substantial ambient pressure this valve 78a could be a pressure relief valve that opens simply at a predetermined hydraulic pressure upstream of the valve 78.

It is believed that the operation of this second embodiment is evident from the description of the operation if the first embodiment, so it will be described briefly herein. The ground engaging wheel 96 rotates at a speed corresponding to the ground speed of the vehicle 10, causing the pump 92 to operate. The speed of this pump 92, relative to the speed of the ground wheel 96, and of the motors 44a are selected so that with the by-pass valve 78a being closed, the pump 44 will drive the belts 38a at a linear speed greater than the speed of travel of the machine 10a over the ground surfaces. However, as the fluid pressure upstream of the motors 44a increases, this valve 78a opens to an extent just sufficient to drop the pressure in the line upstream of the motors 44a so that there is just enough power delivered to cause linear travel of the belts 40a, but not so much power to enable the belts 40a to scruff against the stems of the plants.

It is understood that various modification could be made to the present invention without departing from the basic teachings thereof.

What is claimed is:

1. A system carried in a harvesting machine and adapted to position within a row crops which are being harvested by said machine, said system comprising:

a. a locomotion means adapted to propel said harvesting machine and driveably connected with a fluid circuit means to which fluid pressure is provided;
b. a crop aggregating means adapted to aggregate said crops by bringing first and second crop engaging means into engagement with said crops as said crops pass rearwardly through a pathway defined between said first and second crop engaging means,
c. an aggregating drive means connected driveably in said fluid circuit means and adapted to drive said crop engaging means rearwardly along a crop engaging path as said machine travels forwardly relative to said crop,
d. a control means comprising:
  i. a first pressure sensing means adapted to sense a first fluid pressure in said circuit means at a first side of said aggregating drive means;
  ii. a second pressure sensing means adapted to sense a second fluid pressure in said circuit means at a second side of said aggregating drive means;
  iii. a pressure different valve means operatively connected between said first and second pressure sensing means to be actuated in response to a predetermined pressure difference between said first and second fluid pressures.

2. The system as recited in claim 1, wherein a pump means which provides fluid pressure in said fluid circuit means is connected to said aggregating drive means which in turn is connected to said locomotion means, and said pressure differential valve is connected on one hand, between said pump means and said aggregating drive means, and on the other hand, between said aggregating drive means and said locomotion means; wherein said locomotion means is also connected to said pump means and said system is able to operate in reverse direction by reversal of a flow of fluid through said pump means.

3. A system carried in a harvesting machine and adapted to position within a row crops which are being harvested by said machine, said system comprising:
a. a crop aggregating means adapted to aggregate said crops by bringing first and second crop engaging means into engagement with said crops as said crops pass rearwardly through a pathway defined between said first and second crop engaging means;
b. a drive means connected driveably in a fluid circuit means to which fluid pressure is supplied by a pump means and adapted to drive said crop engaging means rearwardly along a crop engaging path as said machine travels forwardly relative to said crops;
c. a control means comprising a pressure relief means operatively connected in said fluid circuit means in a manner adapted to control fluid pressure to said drive means so that frictional force imparted by said crop engaging means to said crops is alleviated;
d. a ground engaging wheel means adapted to engage a ground surface while said harvesting machine is moving, so as to cause power to be supplied to said pump means in accordance with rotation of said wheel means, said system being characterized in that said fluid circuit means is separate from a locomotion circuit means that supplies power to propel said harvesting machine.

* * * * *